United States Patent
Wall et al.

(10) Patent No.: US 12,172,924 B2
(45) Date of Patent: Dec. 24, 2024

(54) DISSOLVABLE GLASS FIBRES FOR WOOD PRESERVATIVES AND DEGRADABLE COMPOSITE MATERIALS

(71) Applicant: GENICS INC., Acheson (CA)

(72) Inventors: Wesley Wall, Edmonton (CA); Adam Wall, Acheson (CA); Ray Whitaker, Acheson (CA); Wade Chute, Acheson (CA); Shekaib Adab, Acheson (CA)

(73) Assignee: Genics Inc., Acheson (CA)

( * ) Notice: Subject to any disclaimer, the term of this patent is extended or adjusted under 35 U.S.C. 154(b) by 117 days.

(21) Appl. No.: 15/430,295

(22) Filed: Feb. 10, 2017

(65) Prior Publication Data
US 2017/0233288 A1    Aug. 17, 2017

Related U.S. Application Data

(60) Provisional application No. 62/293,697, filed on Feb. 10, 2016.

(51) Int. Cl.
*C03C 25/1095* (2018.01)
*B32B 5/02* (2006.01)
(Continued)

(52) U.S. Cl.
CPC .......... *C03C 25/1095* (2013.01); *B32B 5/022* (2013.01); *B32B 5/024* (2013.01);
(Continued)

(58) Field of Classification Search
CPC ........ B32B 5/00; B32B 9/042; B32B 17/062; B32B 19/042; B32B 13/10; B32B 5/024;
(Continued)

(56) References Cited

U.S. PATENT DOCUMENTS

| | | | |
|---|---|---|---|
| 4,102,664 | A | 7/1978 | Dumbaugh, Jr. |
| 4,294,655 | A | 10/1981 | Pfeffer |

(Continued)

FOREIGN PATENT DOCUMENTS

| | | |
|---|---|---|
| CA | 2 240 216 A1 | 12/1999 |
| EP | 2 374 991 A2 | 10/2011 |

(Continued)

OTHER PUBLICATIONS

Nonwoven definition, Textile Glossary, Celanese Acetate, copyright 2001 (Year: 2001).*

(Continued)

*Primary Examiner* — Jennifer A Steele
(74) *Attorney, Agent, or Firm* — CHRISTENSEN O'CONNOR JOHNSON KINDNESS PLLC

(57) ABSTRACT

A fibre structure formed from dissolvable glass fibres is provided, the dissolvable glass fibres being formed from one or more boron compounds and one or more alkali compounds. The dissolvable glass can be formed into filaments, rovings and staple fibres of varying composition, length and diameter dependent on functionality and purpose. A mixture of chemicals components are heated, melted and then drawn or extruded into dissolvable filaments, rovings and staple fibres for use in a fibre-reinforced composite part or as a preservative in the internal and surface treatment of solid wood and engineered composite panels. A water-soluble surface coating may be applied to adjust dissolution rate and facilitate binding into an air-laid nonwoven mat or incorporation into other matrices.

16 Claims, 4 Drawing Sheets

(51) Int. Cl.

| | | |
|---|---|---|
| B32B 21/02 | (2006.01) | |
| B32B 21/10 | (2006.01) | |
| C03B 37/02 | (2006.01) | |
| C03C 25/26 | (2018.01) | |
| C03C 25/28 | (2018.01) | |
| D04H 1/4218 | (2012.01) | |
| D04H 1/587 | (2012.01) | |
| D04H 3/004 | (2012.01) | |
| D06M 15/05 | (2006.01) | |
| D06M 101/00 | (2006.01) | |
| D06N 3/00 | (2006.01) | |
| D06N 3/04 | (2006.01) | |

(52) U.S. Cl.
CPC .............. *B32B 5/026* (2013.01); *B32B 21/02* (2013.01); *B32B 21/10* (2013.01); *C03B 37/02* (2013.01); *C03C 25/26* (2013.01); *C03C 25/28* (2013.01); *D04H 1/4218* (2013.01); *D04H 1/587* (2013.01); *D04H 3/004* (2013.01); *D06M 15/05* (2013.01); *D06N 3/0011* (2013.01); *D06N 3/04* (2013.01); *B32B 2250/02* (2013.01); *B32B 2255/02* (2013.01); *B32B 2255/26* (2013.01); *B32B 2262/101* (2013.01); *B32B 2307/54* (2013.01); *B32B 2307/7163* (2013.01); *B32B 2307/728* (2013.01); *D06M 2101/00* (2013.01); *D06N 2201/082* (2013.01); *D06N 2203/045* (2013.01); *D06N 2209/1614* (2013.01); *D06N 2209/1621* (2013.01); *D10B 2101/06* (2013.01); *D10B 2201/01* (2013.01)

(58) Field of Classification Search
CPC ......... B32B 5/026; B32B 21/02; B32B 21/10; B32B 5/022; B32B 2307/7163; B32B 2307/728; B32B 2250/02; B32B 2307/54; B32B 2262/101; B32B 2255/26; B32B 2255/02; B27N 3/00; C03C 3/00; C03C 2201/50; C03C 2203/24; C08J 5/00; E21B 23/00; E21B 33/12; D04H 3/004; D04H 1/587; D04H 1/4218; D06N 3/0011; D06N 3/04; D06N 2209/1621; D06N 2201/082; D06N 2203/045; D06N 2209/1614; D06M 15/05; D06M 2101/00; D10B 2201/01; D10B 2101/06
See application file for complete search history.

(56) References Cited

U.S. PATENT DOCUMENTS

| | | | |
|---|---|---|---|
| 4,517,006 A * | 5/1985 | Drake .................... | A01N 25/12 424/426 |
| 4,535,002 A * | 8/1985 | Kirkhuff ................ | C04B 26/02 156/276 |
| 4,587,267 A | 5/1986 | Drake et al. | |
| 4,904,522 A | 2/1990 | Markusch | |
| 5,501,275 A * | 3/1996 | Card ...................... | C09K 8/62 166/280.2 |
| 5,573,055 A | 11/1996 | Melling et al. | |
| 5,846,305 A | 12/1998 | Payzant | |
| 5,997,971 A | 12/1999 | Wall et al. | |
| 6,001,279 A | 12/1999 | Payzant et al. | |
| 6,138,422 A | 10/2000 | Wall et al. | |
| 6,168,870 B1 | 1/2001 | Wall | |
| 6,302,028 B1 | 10/2001 | Guillot-Ulmann et al. | |
| 6,358,531 B1 | 3/2002 | Day et al. | |
| 6,528,443 B1 * | 3/2003 | Healy ..................... | C03C 3/16 501/36 |
| 6,881,766 B2 * | 4/2005 | Hain .................... | A61B 17/06166 523/105 |
| 7,160,606 B2 * | 1/2007 | Wall ...................... | B27K 3/163 106/18.13 |
| 7,661,481 B2 | 2/2010 | Todd et al. | |
| 7,713,553 B2 | 5/2010 | Wall et al. | |
| 8,173,154 B2 * | 5/2012 | Jung .................... | A61L 26/0004 424/445 |
| 8,409,627 B2 * | 4/2013 | Richardson ............ | C09D 15/00 424/630 |
| 8,430,173 B2 | 4/2013 | Todd et al. | |
| 8,430,174 B2 | 4/2013 | Holderman et al. | |
| 8,597,419 B2 * | 12/2013 | Betts ..................... | A01N 37/36 106/15.05 |
| 9,622,483 B2 * | 4/2017 | Bookbinder ........... | A01N 59/14 |
| 10,238,772 B2 * | 3/2019 | Day ....................... | A61L 27/34 |
| 2004/0074643 A1 | 4/2004 | Munoz, Jr. et al. | |
| 2004/0162580 A1 * | 8/2004 | Hain ................. | A61B 17/06166 606/229 |
| 2006/0053739 A1 * | 3/2006 | Jaffee ..................... | B32B 5/022 52/741.3 |
| 2007/0277979 A1 | 12/2007 | Todd et al. | |
| 2011/0014261 A1 * | 1/2011 | Day ........................ | A61L 27/56 424/423 |
| 2011/0247833 A1 | 10/2011 | Todd et al. | |
| 2012/0061088 A1 | 3/2012 | Dykstra et al. | |
| 2014/0038481 A1 * | 2/2014 | Chen ....................... | E04D 1/20 442/59 |
| 2016/0369154 A1 * | 12/2016 | Johnson ................. | C09K 8/032 |
| 2017/0274118 A1 * | 9/2017 | Nazhat .................. | A61L 27/306 |

FOREIGN PATENT DOCUMENTS

| | | | |
|---|---|---|---|
| GB | 642630 | 1/1942 | |
| WO | 00/02004 A2 | 1/2000 | |
| WO | 03/025303 A1 | 3/2003 | |
| WO | 2008/086604 A1 | 7/2008 | |
| WO | 2011/130063 A2 | 10/2011 | |
| WO | WO-2015095745 A1 * | 6/2015 | ............. A61B 17/72 |

OTHER PUBLICATIONS

Ege, Duygu, Zheng, Kai, Boccaccini, Aldo; Borate Bioactive Glasses (BBG): Bone Regeneration, Wound Healing Applications, and Future Directions, ACE Appl. Bio Mater. 2022, 5, 3608-3622 (Year: 2022).*
Aslanova, M.S., and S.Z. Vol'skaya, "Strength and Structure of Fibers from Borate, Cadmium, and Lead Glasses," in "The Structure of Glass: vol. 6—Properties, Structure and Physical-Chemical Effects," translated from Russian by E. Boris Urarov, New York: Consultants Bureau, pp. 227-230, 1966.
Donohoe, L.M., and J.E. Shelby, "Formation and Properties of Soda-Lime Borate Glasses," Physics and Chemistry of Glasses—European Journal of Glass Science and Technology Part B 47(1):16-21, Jun. 2005.
Doweidar, H., et al., "Density of Mixed Alkali Borate Glasses: A Structural Analysis," Physica B: Condensed Matter 362(1-4):123-132, May 2005.
El-Alaily, N.A., et al., "Durability of Some Gamma-Irradiated Alkali Borate Glasses," Radiation Physics and Chemistry 44(1-2):45-51, Jul.-Aug. 1994.
Khazanov, V.E., et al., "Glass Fibers," in V.I. Kostikov (ed.), "Fibre Science and Technology," Chapman and Hall, London, Chap. 1, pp. 15-230, 1995.
Makishima, A., and J.D. Mackenzie, "Direct Calculation of Young's Modulus of Glass," Journal of Non-Crystalline Solids 12(1):35-45, 1973.
Pye, L.D., et al., "Borate Glasses: Structure, Properties, Applications (Materials Science Research)," Springer, vol. 12, 1978, 648 pages.
Rahaman, M.N., et al., "Bioactive Glass in Tissue Engineering," Acta Biomaterialia 7(6):2355-2373, Jun. 2011.
Ruller, J., and J.E. Shelby, "The Mixed Cation Effect in Silver-Alkali Borate Glasses," Physics and Chemistry of Glasses 29(5):209-213, 1988.

(56) References Cited

OTHER PUBLICATIONS

Veléz, M.H., et al., "Chemical Durability of Lithium Borate Glasses," Journal of Non-Crystalline Solids 49(1-3):351-362, May 1982.

Wood, W.G., "An Introduction to Boron: History, Sources, Uses, and Chemistry," Environmental Health Perspectives 102(7):5-11, Nov. 1994.

Zhang, Z., "Corrosion of $20M_2O.80B_2O_3$ (M=Li, Na and K) Glasses in Water," Physics and Chemistry of Glasses 37(5):221-222, 1996.

Zhang, Z., et al., "Water Corrosion Behavior of Densified Glass. II. Borate Glasses," Journal of Non-Crystalline Solids 135(1):62-66, Oct. 1991.

\* cited by examiner

| Reading | Diameter (µm) |
|---|---|
| 1 | 200.0 |
| 2 | 59.5 |
| 3 | 37.9 |
| 4 | 59.5 |
| 5 | 81.1 |
| Average | 87.6 |
| Stdev | 64.7 |
| Min | 37.8 |
| Max | 200.0 |

FIG. 1C

DISSOLVABLE GLASS FIBRES FOR WOOD PRESERVATIVES AND DEGRADABLE COMPOSITE MATERIALS

FIELD

This relates to water-soluble glass fibres, including staple fibres, filaments and roving, for use in biodegradable composite parts, wood preservation, and other applications in which the solubility of the fibres is desired.

BACKGROUND

Fibreglass is a versatile material that can be formed into strong, lightweight structures of various shapes and sizes. U.S. Pat. No. 4,904,522 (Markusch) entitled "Process for the production of fiberglass mats" and U.S. Pat. No. 4,294,655 (Pfeffer) "Method and apparatus for forming fiberglass mats" describe processes for producing fibreglass structures.

SUMMARY

According to an aspect, there is provided a fibre structure formed from dissolvable glass fibres, the dissolvable glass fibres being formed from one or more boron compounds and one or more alkali compounds.

According to other aspects, the fibre structure may comprise one or more of the following features: the dissolvable glass fibres may comprise dissolvable glass staple fibres, filament or roving; the fibre structure may be in the form of a degradable composite part; the fibre structure may comprise a wood preservative; the dissolvable glass fibres may comprise a dissolvable glass roving formed into a woven or knitted structure and infused with thermoplastic or thermoset resins for use in a fibre-reinforced composite part; the dissolvable glass fibres may comprise a dissolvable glass roving formed by filament winding and pultrusion, and the fibre structure may further comprise thermoset resins to produce pressure pipe or structural composite parts; the dissolvable glass fibres may comprise dissolvable glass staple fibres made from chopped filament or roving, formed into a non-woven structure and infused with thermoplastic or thermoset resins for use in a fibre-reinforced composite part; the dissolvable glass fibres may comprise dissolvable glass staple fibres made from chopped filament or roving, and the fibre structure may further comprise thermoplastic resin or rubber and is formed into injection-moulded and extruded fibre-reinforced composite parts; the dissolvable glass fibres may comprise dissolvable glass staple fibres made from chopped filament or roving, and the dissolvable glass fibres may be coated with water-soluble binders or resins, and formed into a non-woven structure for application to the surface of wood as a preservative; the dissolvable glass fibres may comprise dissolvable glass staple fibres made from chopped filament or roving, and may comprise a wood preservative that is incorporated within the structure of an engineered fibre composite panel; the dissolvable glass fibres may be uncoated or coated with water-soluble binders or resins; and the engineered fibre composite panel may comprise a medium density fibreboard (MDF) or oriented strand board (OSB).

According to an aspect, there is provided a method of forming a dissolvable fiberglass structure, comprising the steps of: melting a mixture of one or more boron compounds and one or more alkali compounds; forming the melted mixture into dissolvable glass fibres; and forming the dissolvable glass fibres into a desired structure having a dissolution rate.

According to other aspects, the method may further comprise one or more of the following elements: melting the mixture may comprise selecting the compounds to provide a desired dissolution rate; forming the dissolvable glass fibres may comprise embedding the dissolvable glass fibres in a structural additive; the structural additive may be selected to adjust the dissolution rate of the desired structure; the desired structure may be a composite wood product and the dissolvable glass fibres are embedded within the composite wood product; the desired structure may be a coating over a wood product; and the desired structure may be a component of a tool or equipment.

According to an aspect, there is provided a dissolvable glass composition that has been extruded, drawn or spun into filaments having a diameter of less than about 200 μm.

According to another aspect, the dissolvable glass composition may comprise equal measures by weight of boric acid and disodium octaborate tetrahydrate.

According to another aspect, the dissolvable glass composition may comprise one or more compounds selected from a group consisting of: hydrated alkaline borates, hydrated non-alkaline borates, refined borate, mineral borate, sodium borate, sodium metaborate, disodium octaborate tetrahydrate, borax, boric acid, copper borate, lithium borate, potassium borate, silver borate, zinc borate, boron halide, colemanite, kernite, probertite, tincal, and ulexite.

According to another aspect, the method may further comprise the step of selecting the amount of the one or more hydrous compounds in the mixture to adjust a dissolve rate of the fibre.

According to another aspect, the method may further comprise the step of adding an additive to the mixture to adjust the dissolution rate of the fibre.

According to an aspect, the dissolvable glass composition may comprise one or more additives having at least one of corrosion resistant and antibacterial properties.

According to another aspect, the method may further comprise the step of selecting the amount of the one or more hydrous compounds in the mixture to adjust the dissolution rate of the fibre.

According to another aspect, the dissolvable borate fibre may further comprise an additive selected from a group I, group II, and group III metal on the periodic table to the mixture.

According to another aspect, the dissolvable borate fibre may further comprise an additive selected from a group consisting of copper, manganese, molybdenum, zinc, calcium, and silver.

According to an aspect, there is provided a dissolvable borate fibre, comprising an anhydrous borate compound that is extruded, drawn or spun to form fibre having a Young's Modulus of at least 20 GPa, the anhydrous borate compound comprising between about 75 and 97 mol % of $B_2O_3$; and between about 3 and 25 mol % of one or more alkali oxide.

According to another aspect, a majority of the alkali oxide may comprise $Na_2O$.

According to another aspect, the dissolvable borate fibre may comprise about 82 mol % of $B_2O_3$ and about 18 mol % of one or more alkali oxide, and the object has a Young's Modulus of at least 40 GPa.

According to another aspect, the anhydrous borate compound may be substantially free of silicate.

According to another aspect, the dissolvable glass filaments are coated with a water-soluble binder or resin.

According to another aspect, the water-soluble coating is selected from a group of biodegradable polymers that includes polysaccharides, proteins, lipids, polyhydroxy alkanoates, polylactides, polycaprolactones, polyesteramides, aliphatic or aromatic co-polyesters.

According to another aspect, the water-soluble coating is polyvinyl alcohol.

According to another aspect, the coated dissolvable glass staple fibres are formed into a nonwoven mat for use in a bandage-style wood preservative delivery system.

According to another aspect, the uncoated or coated dissolvable glass staple fibres are blended with wood fibres and formed into engineered panel products such as medium density fibreboard (MDF) or oriented strand board (OSB).

According to another aspect, the dissolvable glass filaments are spun into continuous roving.

According to another aspect, there is provided a woven mat, formed from dissolvable glass filaments or roving as described above, suitable for resin transfer moulding, vacuum bag moulding, or other similar process used in the production of fibreglass composite parts.

According to another aspect, there is provided a continuous filament or roving, formed from dissolvable glass fibres as described above, suitable for use in filament winding, pultrusion, or other similar processes used in the manufacture of fibre-reinforced plastic pipe or structural composite parts.

According to another aspect, the dissolvable glass filaments or roving are chopped into staple fibres of less than about 150 mm in length as required by the intended application.

According to another aspect, the staple fibres are 50-150 mm in length for forming into a nonwoven mat.

According to another aspect, the staple fibres are 3-50 mm in length for incorporation with wood fibres in engineered panel products such as medium density fibreboard (MDF) or oriented strand board (OSB).

According to another aspect, the staple fibres are 3-50 mm in length for incorporation with rubber, thermoplastic or thermoset resins in biodegradable composites.

While not explicitly described, other aspects and embodiments will be apparent to those skilled in the art by combining the features listed above in any reasonable combination.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 1C is a chart of sizes of example dissolvable glass fibres.

DETAILED DESCRIPTION OF THE PREFERRED EMBODIMENT

There will now be described a dissolvable glass fibre 10 that may be extruded, drawn or spun from various compositions into different lengths, diameters and surface treatments, the selection of which will be dependent on the function that it is intended to accomplish.

Water-soluble glass fibres may be made by blending and melting one or more soluble minerals together, extruding the melted mixture through a bushing that contains one or more small holes, cooling the resulting filaments with air, and coating the filaments with a water-soluble sizing agent before either chopping them into shorter staple fibres using air or other mechanical means, or spinning them into continuous roving that comprises multiple filaments.

The dissolution rate (expressed as units of mass per unit of time) of water-soluble glass fibres is dependent upon several factors, including the solubility of the glass composition itself, the type and thickness of coating (if any) applied, the surface area exposed to moisture or water, and the quantity and flowrate of water into which the fibre will dissolve. The total time required to dissolve a water-soluble glass fibre is dependent upon its dissolution rate and its mass or diameter. By blending water-soluble glass fibres of different geometries and coating thicknesses into a compounded, wound, nonwoven or woven structure, different dissolution profiles can be achieved.

Applications for dissolvable glass fibres in composites include: Filaments and roving such as temporary filament-wound pressure pipe, pultruded beams and tubing, woven mats for transfer moulding; long and short staple fibres such as nonwoven mats for transfer moulding, compounded and extruded/injection-moulded parts and gaskets. For all fibre forms, these fibres can be embedded into both conventional and biodegradable thermoplastic and thermoset resin matrices.

Applications for dissolvable glass fibres in wood preservation may be more focused on the use of long and short staple fibres made from individual filaments or chopped roving either as interstitial fibre preservatives in engineered composites (e.g. OSB, MDF) or as nonwoven pads in surface-applied bandage-style preservative systems.

Figure 1A:
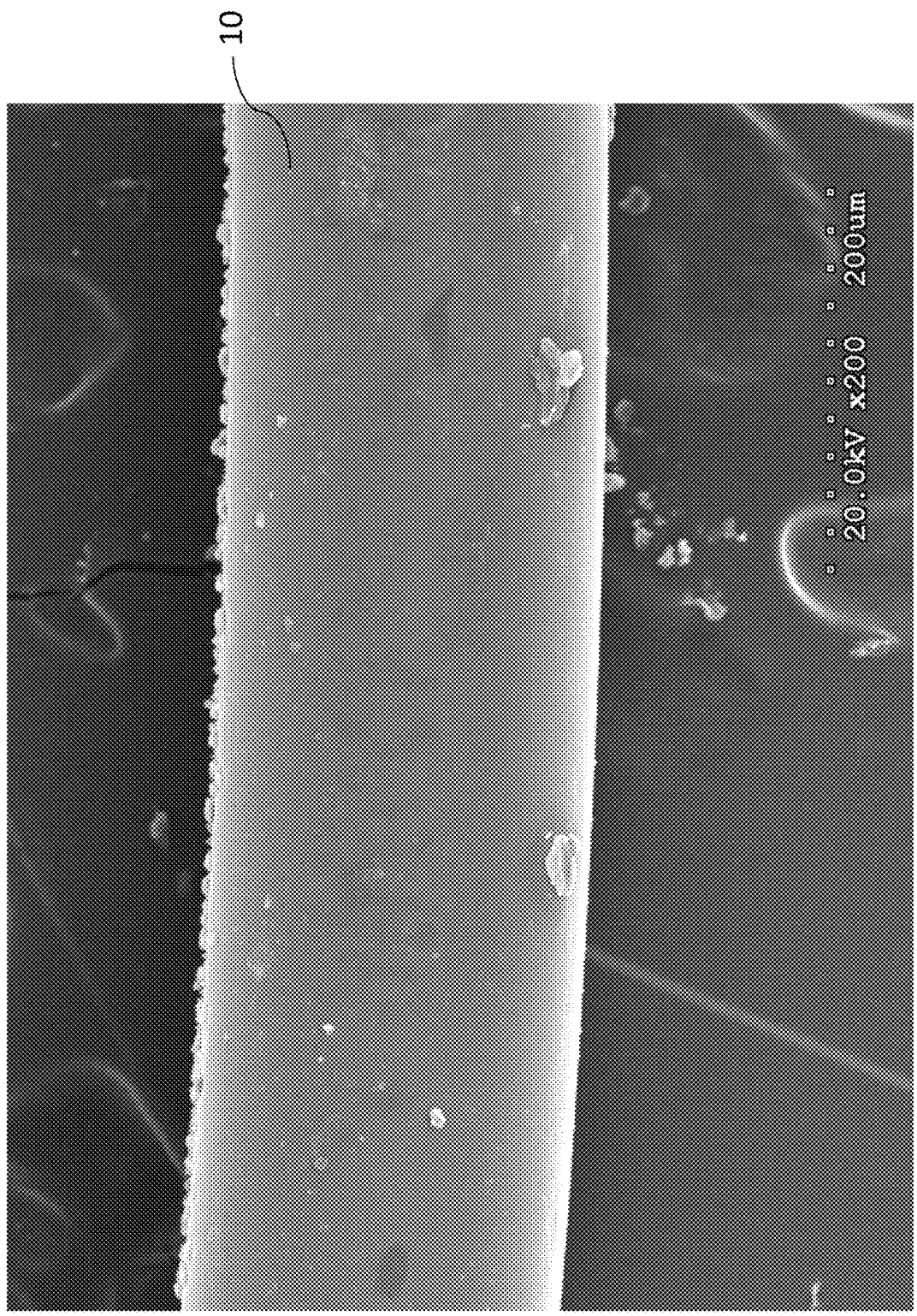
FIG. 1A depicts a photograph of an example dissolvable glass fibre.
Figure 1B:
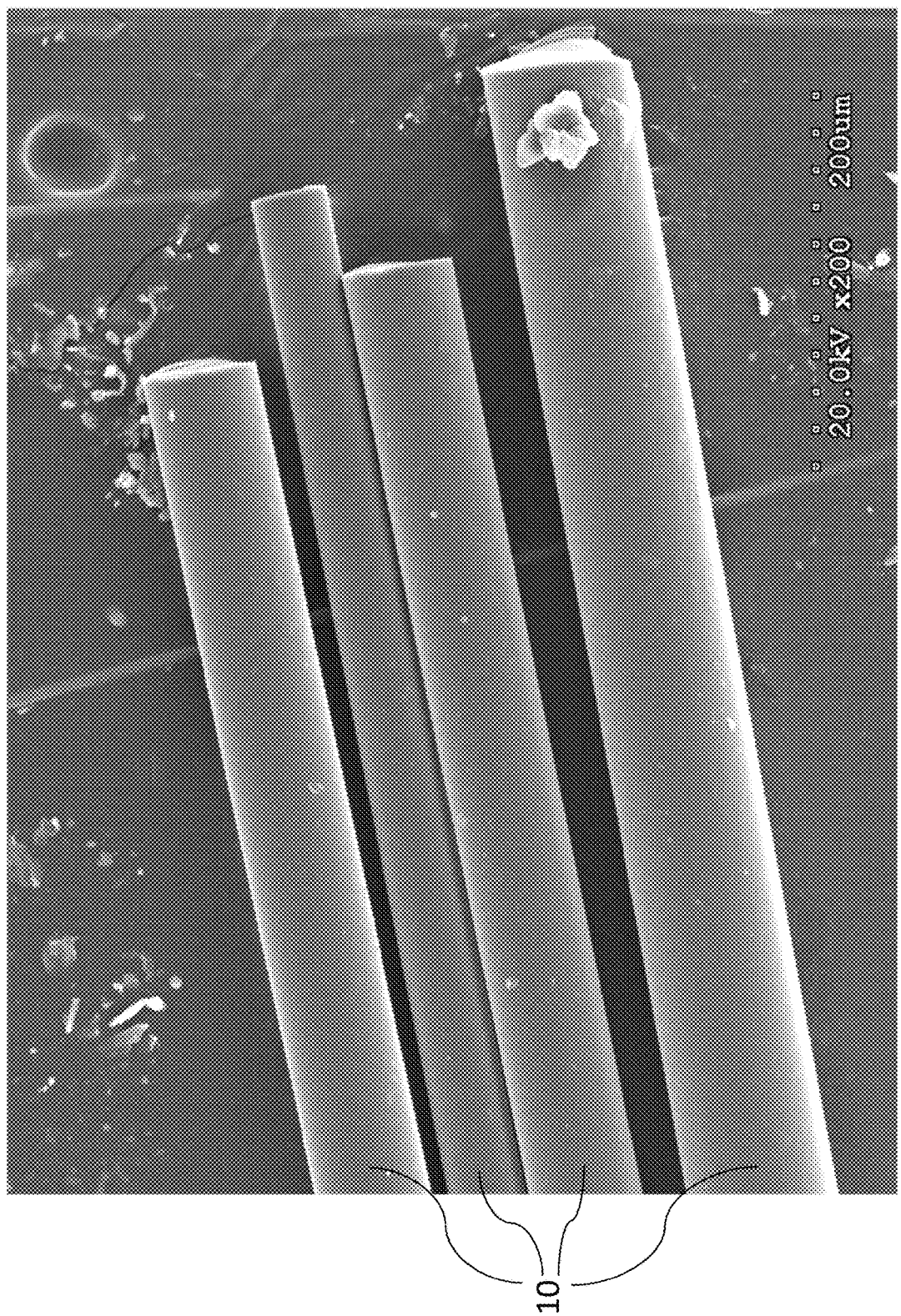
FIG. 1B depicts a photograph of example dissolvable glass fibres.

FIG. 1A and FIG. 1B, shows photographs that depict fibres 10 with different diameters listed in FIG. 1C that were produced by simple gravity drawing. It will be understood that mechanically-assisted drawing or extrusion can extend the range of filament diameters that can be produced. While not shown, it will also be understood that filaments may be chopped into staple fibres or may be spun together into a continuous roving that may then be chopped into staple fibres prior to use. Furthermore, changing composition and melt temperature, changing the number and dimensions of orifices in the bushing, increasing extrusion pressure, and mechanically drawing the fibre after extrusion will alter the dissolution profile, filament diameter, and roving strength. Coating selection and thickness will also alter the dissolution rate and time. Blends of fibres having different diameters and coating thicknesses can be prepared to customize the dissolution profile of the resulting product 24.

The material used to fabricate the dissolvable glass fibres 10 may vary depending on the preferences of user and the intended use of the fibres. In one example, the components of the mixture include refined or mineral sources of boron. This may include hydrated alkaline and nonalkaline, mineral or refined borates, such as sodium borate, disodium octaborate tetrahydrate (DOT), sodium metaborate, borax, boric acid, metallic borate compounds such as copper, lithium, potassium, silver, and zinc, and other boron halide materials. Mineral borates may also be used, such as colemanite, kernite, probertite, tincal, ulexite, Neobor™ (available from Borax), etc. In addition, multiple sources of boron may be mixed together in equal or disproportionate amounts.

The mixture preferably has at least one hydrous compound, such that the mixture is a hydrous mixture when melted. It has been found that this assists in forming a moldable mixture once heated, and in some cases, the hydrous form of the compounds are less expensive and easier to procure. As will be apparent from the discussion below, other mixtures that are anhydrous and that allow the desired end composition to be achieved may also be used.

Some examples of formulations for making the dissolvable material include: two-part mixtures made up of boric acid and DOT with about 25-50 wt % and 50-75 wt % of each component being present in the mixture; 95 wt % boric acid and 5 wt % DOT; 2.9 wt % copper hydroxide, 7.1 wt % boric acid, and 90 wt % DOT; and 10 wt % copper hydroxide, 10 wt % boric acid, and 80 wt % DOT. In another example, one or more sources of boron are mixed with one or more sources of alkali metal, such as Na, K, Li, or Ca, preferably one of which is in a hydrous form. For example, DoT is a hydrous form of Na, although Na may also be added in other forms, such as NaOH, or a mixture of hydrous and non-hydrous forms. In addition, boron may be added in hydrous or non-hydrous forms, or combinations thereof. Those of ordinary skill will be able to choose appropriate amounts of each component required to achieve the desired end composition, described below.

In one example, the final composition, once heated, will have a formula of between about 10-25 mol % $Na_2O$ and between about 75-90 mol % $B_2O_3$. In a preferred embodiment, there may be about 18 mol % $Na_2O$ and 82 mol % $B_2O_3$. It will be understood that there may be some inherent variation in the actual chemical formula due to imperfect mixing or distribution, or inexact variations. For example, in terms of boric oxide the final compound may have small amounts of both hydrous and anhydrous states of boric oxide. In addition, there may be trace amounts of impurities such as fluoride, sulphate and iron. The amount of variation will depend on the source, and the tolerances for a particular application. Similar considerations may also apply to other components, including alkalis.

A portion of Na may be replaced with other alkalis to achieve a desired set of physical characteristics, and other additives may also be present to introduce other elements that may perform other functions. It will be apparent that different additives will affect the properties in different ways, and care must be taken to ensure the properties are suitable for the intended use. As can be seen, the dissolvable material is preferably free of silicates, which is the base material used in forming most common types of glass.

Pure $B_2O_3$ has a $T_g$ (glass transition temperature) of about 260° C. due to the layered structure composed of strong $BO_3$ triangles, which form a layer type of structure similar to that in mica. Bonding between the layers is very weak, allowing a measurable viscosity at low temperature and a high thermal expansion. Adding $Na_2O$ provides an extra oxygen which is used by a B to become 4 fold coordinated, with the extra oxygen providing a bridge between 2 $BO_3$ layers. This reduces mobility of the structure and causes a decrease in thermal expansion and an increase in $T_g$. For example, one example that contains 12 mol % $Na_2O$ has a $T_g$ of 380° C. and a linear expansion of 160° C. Young's Modulus of the glass will increase with the initial additions of alkali as expected due to the increase in strong bonds between layers. Since the layers are increasingly bridged, one would expect the strength to increase as well, and in fact, the "theoretical" strength, which is determined primarily by Young's Modulus and Fracture Surface Energy, does increase. However, there are also other important attributes to consider as well.

The most logical way to increase modulus is by an increase in Na content. However, a mixed alkali composition could also be used, such as by adding some additional Li, or K, or Ca. It was found that adding CaO to the mixture in the amounts of 12 mol % CaO, 12 mol % $Na_2O$ to 76 mol % $B_2O_3$ did not give favorable results, due to the high melting point of the composition. Adding $Na_2O$ alone still increases the Modulus but with a much smaller effect on viscosity ($T_g$) and melting point. This is shown in FIG. 3.

The melting point of pure $B_2O_3$ is seen to be about 600° C., while adding 12 mol % $Na_2O$ melts near 800° C., and the proposed 18 mol % $Na_2O$ melts at 825° C. Commercial glasses are typically melted at a temperature where the viscosity is about 100 Poise. The viscosity of the 12 and 18 mol % $Na_2O$ melts are relatively low even at 800° C., and fairly rapid fining (i.e. bubble removal) can be expected. The 12 mol % glass has a viscosity of 50 poise and the 18 mol % glass has a viscosity of a little less than 100 poise. At 900° C., the 18 mol % $Na_2O$ glass has a viscosity of about 20 Poise, much lower than generally used for glass melting. Thus, both glasses can likely be melted at about 850° C. (1550° F.), or just above the liquidous phase, with rapid homogenization. It has been found that substantially all water is removed after 1 hour at this temperature and that the glasses formed are bubble free. Any bubbles that may appear in the poured samples after these periods are likely due to those which form at the glass/air/crucible interfaces and which flow out with the glass as it is poured.

It should be noted that when using stainless steel crucibles for chemical reactions and oxidation, temperatures above about 850° C. should be avoided. As the viscosity data indicate that the higher temperatures are not needed, it is possible to use stainless steel crucibles if care is taken to avoid exceeding the maximum temperature, at which point bubble formation may occur due to corrosion.

If a lower viscosity is desired, it may be possible to add a small amount of $Li_2O$ in place of some of the $Na_2O$.

Once the mixture is formed, it is then melted by applying heat. If the mixture is not heated properly, the resulting glass may be weakened and may affect the consistency of the dissolving characteristics of the part. It is believed that the weakness may result from water being present in the mixture, and that the effect can be reduced by properly heating the mixture such that the mixture is formed into the desired glass fibres in an anhydrous state. Care must also be taken not to heat mixture too long, as boron may be released from the mixture and release oxygen into the mixture, which may weaken the glass once cooled, or the mixture may set such that it cannot easily be formed. It has been found that a solid anhydrous compound cannot be easily melted to a formable state without a significant increase in the expenditure of energy required.

In one example, the dissolvable glass fibres 10 may be intended for use in wood preservatives, in which case the form and geometry of the fibres will be dependent on the desired dissolution profile and treatment method. Known processes for producing suitable glass fibres may be used. For example, continuous filaments may be used individually or, more commonly, spun together into a roving that can be coated with water-soluble resins or binders, chopped into staple fibres of various lengths, and embedded with wood fibres or strands in the wood product to be preserved, which may be an engineered fibre composite panel, such as medium density fibreboard or oriented strand board for delivery of wood preservatives. Chopped staple fibres may also be formed into a mat, such as an air-laid nonwoven mat that may be applied to the surface of solid wood, such as dimensional lumber, wooden posts or utility poles for delivery of wood preservatives. In both cases, the preservative is delivered by dissolution in moisture present in the wood and subsequent diffusion into and throughout the wood structure.

In another example, the dissolvable glass fibers may be used in composite structures. The fibres may take various known forms of fiberglass as is known in the art, such as continuous filament, spun roving, and chopped staple fibres. For example, continuous filaments may be used individually or, more commonly, spun together into a roving that may be used to create woven or knit fabric structures for resin transfer moulding or vacuum bag moulding, coated with thermoset resins and wrapped around a mandrel to create filament-wound composite pressure piping, chopped and coated with a binder and/or thermoset resin to create spray-up fiberglass composites, or chopped and compounded with thermoplastic resins or rubbers to create injection-moulded or sheet-moulded parts. Chopped filaments and roving may also be air-laid into a nonwoven pad that may be used in resin transfer moulding. Using these and other known techniques, various shapes and structures may be formed. For example, a dissolvable housing may be useful in some circumstances, such as to reduce the size of the tool or equipment, or to allow a component of the tool or equipment to dissolve, at an opportune time. As examples, the part may be dissolved to release, activate, or deactivate a tool, or make a tool retrievable. Examples of situations in which this may be beneficial include downhole applications in a hydrocarbon well, or other operations that may benefit from a tool or other equipment with a dissolving part.

The composition and method of forming the dissolvable glass fibres 10 will vary based on function. In each of the examples given above, the formulation of the glass fibres may be based on the previous discussion of forming a dissolvable glass. The method to form the dissolvable fibres begins by assembling an appropriate mixture of components. These components will generally be in powder form as this allows the components to be easily measured and mixed together, although the components may be provided in other convenient states.

Figure 2:
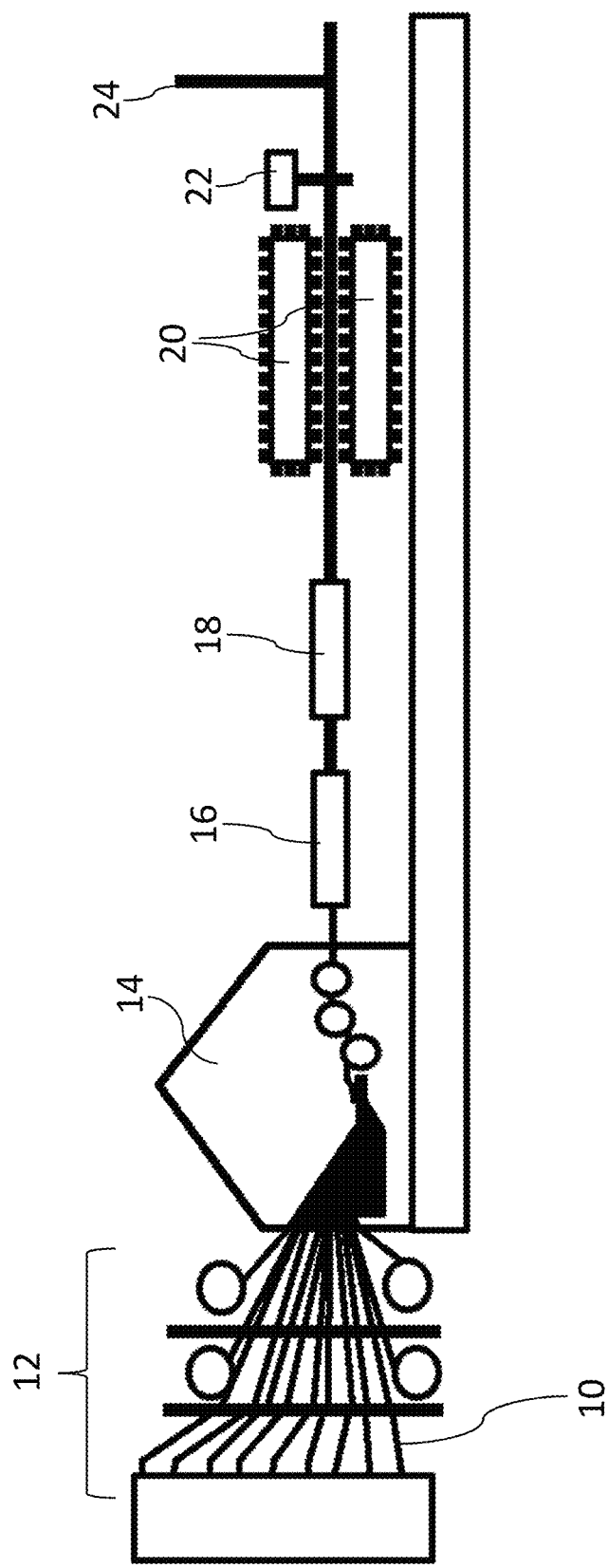
FIG. 2 is a schematic of a manufacturing process for glass fibre involving pultrusion.

The dissolvable glass components are mixed and melted to form a liquid state until the mixture is at an appropriate state to be drawn or extruded. Once the composition has reached the appropriate state, it extruded through a heated bushing having multiple small orifices that provide the initial diameter of the resulting filaments as well as the number of filaments in the roving. Mechanical drawing of the filaments/roving while it is still at a temperature where it can be worked will further stretch and reduce the diameter of the filaments/roving. The glass composition, and the number and diameter of filaments in the roving will determine the fibre's strength, flexibility, and dissolution profile. The filaments or roving may be coated with a water-soluble binder or resin which will further adjust their dissolution profile. Roving is then used to form woven, filament-wound or pultruded structures, or it may be chopped into shorter staple fibres for air-laid nonwoven structures, spray-up composites, or interstitial fibres in other matrices, including moulded rubber, thermoplastic composites, and engineered fibre panels such as OSB and MDF. An example of a pultrusion process is shown in FIG. 2, which depicts reinforcement material 12, resin bath 14, performing die 16, heating die 18, pullers 20, saw 22, and finished product 24. Other processes or variations on the depicted process may also be used.

As an alternative to the production of staple fibres from continuous filament and roving, dissolvable glass staple fibres may also be produced by blowing or blasting the fibres with air or steam as they exit the bushing to produce a shorter staple length. Here too, the glass composition, the number and diameter of filaments in the roving, and the type and thickness of coating applied will determine the dissolution profile. Coated staple fibres then usually vacuum-formed into an air-laid mat that will be used as a surface treatment in wood preservation, or infused with resin in the formation of a composite part.

The dissolution profile of the soluble glass fibres may be modified based on the selection of the components used to create the mixture and the relative proportions of the components in the mixture. The dissolution rate may also be adjusted through the use of additives, such as group I, group II, or group III metals on the periodic table. The dissolvable glass fibre geometry may be used as a delivery method for compounds that act as corrosion inhibitors, such as for example, copper, zinc, and silver. Additionally, the additives may deliver antibacterial compounds such as silver, copper, and zinc compounds or any metalloid that exhibits antibacterial properties. Additives with other properties may also be included in the fibres. The dissolution rate may also be modified by varying the fibre diameter, and the type and thickness of coating used.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The scope of the following claims should not be limited by the preferred embodiments set forth in the examples above and in the drawings, but should be given the broadest interpretation consistent with the description as a whole.

What is claimed is:

1. A wood preservative, comprising:
   a fibre structure formed from dissolvable glass fibres, the dissolvable glass fibres comprising one or more boron compounds and one or more alkali compounds, the dissolvable glass fibres comprising between 82 and 97 mol % $B_2O_3$, the dissolvable glass fibres having a composition and dissolution rate suitable for use as a wood preservative;
   wherein the dissolvable glass fibres comprise dissolvable glass staple fibres made from chopped filament or roving, and wherein the dissolvable glass staple fibres are coated with a water-soluble binder that binds the dissolvable glass staple fibres into a non-woven structure for application to a surface of wood to be preserved.

2. The wood preservative of claim 1, in the form of a degradable composite part.

3. The wood preservative of claim 1, the dissolvable glass fibres further comprising an antimicrobial additive that is released as the dissolvable glass fibres dissolve.

4. The wood preservative of claim 1, wherein the water-soluble binder comprises thermoplastic or thermoset resins for use in a fibre-reinforced composite part.

5. The wood preservative of claim 1, wherein the dissolvable glass fibres comprise dissolvable glass staple fibres made from chopped filament or roving, formed into a non-woven structure and infused with thermoplastic or thermoset resins for use in a fibre-reinforced composite part.

6. The wood preservative of claim 1, wherein the dissolvable glass fibres comprise dissolvable glass staple fibres made from chopped filament or roving, and the fibre structure further comprises thermoplastic resin or rubber and is formed into injection-moulded and extruded fibre-reinforced composite parts.

7. A wood preservative, comprising:
a fibre structure formed from dissolvable glass fibres, the dissolvable glass fibres comprising one or more boron compounds and one or more alkali compounds, the dissolvable glass fibres comprising between 82 and 97 mol % $B_2O_3$, the dissolvable glass fibres having a composition and dissolution rate suitable for use as a wood preservative;
wherein the dissolvable glass fibres comprise dissolvable glass staple fibres made from chopped filament or roving, and is incorporated within the structure of an engineered fibre composite panel.

8. The wood preservative of claim 7, wherein the engineered fibre composite panel comprises a medium density fibreboard (MDF) or oriented strand board (OSB).

9. The wood preservative of claim 1, wherein the dissolvable glass fibres consist of the one or more boron compounds and the one or more alkali compounds.

10. A wood preservative, comprising:
a non-woven pad adapted to be applied to a surface of wood to be preserved, the non-woven pad being formed from dissolvable glass fibres comprising one or more boron compounds and one or more alkali compounds, the one or more boron compounds comprising between 82 and 97 mol % $B_2O_3$;
wherein the dissolvable glass fibres are coated with a water-soluble binder that binds the dissolvable glass fibres in the non-woven pad.

11. The wood preservative of claim 10, wherein the dissolvable glass fibres further comprise a wood preservative compound that is released as the dissolvable glass fibres dissolve.

12. The wood preservative of claim 10, wherein the dissolvable glass fibres are coated with a water-soluble binder that binds the dissolvable glass fibres in the non-woven pad.

13. An engineered fibre composite panel, comprising:
a fibre structure formed from dissolvable glass fibres, the dissolvable glass fibres comprising one or more boron compounds and one or more alkali compounds, the one or more boron compounds comprising between about 82 and 97 mol % $B_2O_3$, wherein the dissolvable glass fibres comprise dissolvable glass staple fibres made from chopped filament or roving, and further comprise a wood preservative that is incorporated within the structure of an engineered fibre composite panel.

14. The engineered fibre composite panel of claim 13, wherein the dissolvable glass fibres are uncoated.

15. The engineered fibre composite panel of claim 13, wherein the engineered fibre composite panel comprises a medium density fibreboard (MDF) or oriented strand board (OSB).

16. A fibre structure formed from dissolvable glass fibres, the dissolvable glass fibres comprising one or more boron compounds and one or more alkali compounds, the one or more boron compounds comprising between about 82 and 97 mol % $B_2O_3$, wherein the dissolvable glass fibres are coated by a water-soluble coating that is distinct from the dissolvable glass fibres.

\* \* \* \* \*

UNITED STATES PATENT AND TRADEMARK OFFICE
CERTIFICATE OF CORRECTION

PATENT NO. : 12,172,924 B2
APPLICATION NO. : 15/430295
DATED : December 24, 2024
INVENTOR(S) : Wesley Wall et al.

Page 1 of 1

It is certified that error appears in the above-identified patent and that said Letters Patent is hereby corrected as shown below:

In the Claims

| Column | Line | |
|---|---|---|
| 8 | 42 | Claim 1, delete "mol % $B_2O_3$," and insert -- mol% $B_2O_3$, -- |
| 9 | 9 | Claim 7, delete "mol % $B_2O_3$," and insert -- mol% $B_2O_3$, -- |
| 9 | 29 | Claim 10, delete "mol % $B_2O_3$;" and insert -- mol% $B_2O_3$; -- |
| 10 | 13 | Claim 13, delete "mol % $B_2O_3$;" and insert -- mol% $B_2O_3$; -- |
| 10 | 28 | Claim 16, delete "mol % $B_2O_3$," and insert -- mol% $B_2O_3$, -- |

Signed and Sealed this
First Day of July, 2025

Coke Morgan Stewart
*Acting Director of the United States Patent and Trademark Office*